(12) United States Patent
Morck

(10) Patent No.: US 9,068,676 B2
(45) Date of Patent: Jun. 30, 2015

(54) VERTICAL CONNECTOR

(75) Inventor: Morten Rengman Morck, Oslo (NO)

(73) Assignee: AKER SUBSEA AS, Lysaker (NO)

(*) Notice: Subject to any disclaimer, the term of this patent is extended or adjusted under 35 U.S.C. 154(b) by 1131 days.

(21) Appl. No.: 12/562,770

(22) Filed: Sep. 18, 2009

(65) Prior Publication Data

US 2011/0042934 A1  Feb. 24, 2011

(30) Foreign Application Priority Data

Aug. 21, 2009 (NO) .................................. 2009 2880

(51) Int. Cl.
*F16L 1/26* (2006.01)
*E21B 43/01* (2006.01)

(52) U.S. Cl.
CPC .............. *F16L 1/26* (2013.01); *E21B 43/0107* (2013.01)

(58) Field of Classification Search
USPC ........ 285/24, 27, 31, 14.19, 148.19, 330, 920
See application file for complete search history.

(56) References Cited

U.S. PATENT DOCUMENTS

| | | | | |
|---|---|---|---|---|
| 2,887,124 A | * | 5/1959 | Mehl | 137/614.06 |
| 3,239,248 A | * | 3/1966 | Jones | 285/123.11 |
| 4,508,404 A | * | 4/1985 | Frawley | 439/153 |
| 4,688,633 A | * | 8/1987 | Barkley | 166/341 |
| 7,402,000 B2 | * | 7/2008 | Bastesen et al. | 405/170 |

* cited by examiner

*Primary Examiner* — Aaron Dunwoody
*Assistant Examiner* — Fannie Kee
(74) *Attorney, Agent, or Firm* — Gable Gotwals

(57) ABSTRACT

A vertical connector composed of three main components; one stationary connector part on a submerged connecting point, one mobile connector part intended for submerging and connecting to the stationary connector part and a connector which subsequent to the mating of the connector parts locks the connector parts together into permanent sealing connection. The stationary connector part has an upwards projecting pipe boss, and the mobile connector part has integrated, internally shielding and guiding means to assist the entering of the mobile connector part onto the stationary connector part.

12 Claims, 5 Drawing Sheets

VERTICAL CONNECTOR

CROSS-REFERENCE TO RELATED APPLICATIONS

This application claims priority to Norwegian Patent Application No. 2009 2880, filed Aug. 21, 2009.

BACKGROUND OF THE INVENTION

The present invention relates to a vertical connector composed of three main components; one stationary connector part on a submerged connecting point, one mobile connector part intended for submerging and connecting to the stationary connector part and a connector which subsequent to the mating of the connector parts locks the connector parts together till permanent sealing connection.

In this context vertical connector has the meaning that the connector parts are mated in a substantial vertical direction.

Subsea structures deployed on the seabed are often arranged with piping having one or more pipes that ends in open pipe terminations which constitute a connecting point. Each connecting point includes a stationary connector part. The connecting point is later used for connection to an external or outboard pipe.

There exist two principles for the connectors, either vertical or horizontal connectors. For a horizontal connector the connecting point projects horizontally out from the structure. In the North Sea this solution almost has market control. Other places, like the Gulf of Mexico, the vertical solution, to which the present application relates, is the most common one.

A typical example of use of the vertical connectors is in the so called "jumpers", i.e. often rigid pipes extending between two connecting points. Look to FIGS. 1A and 1B. This rigid pipe has a mobile connector part at each end facing downwards. Such pipes rarely extend in a straight line between the connecting points. They have deliberately been designed with one or more bays in order to be able to be fitted with the connecting points without too stringent requirements to the tolerances. Long spans of several tenths of meters between the connecting points may exist. Even if the pipes have their bays, they will behave quite intractable.

It is to be mentioned that in principle there are three (or actually two) different forms for connections to a structure:

Direct connection between two structures. Here, a rigid pipe having a mobile connector part at each end normally will be used. This will usually be termed a jumper. The jumper will be manufactured based on measuring the relative position of the two connecting points. The measuring is not 100% precise, and it will also be tolerances in connection with the construction of the jumper itself. These tolerances create resistance against pulling the two pipe ends together. The jumper needs to be designed such that the jumper has sufficient flexibility to absorb these tolerances, in addition to possible displacements which may arise during operations of the system, for example thermal expansion of the pipe.

Connection between the end of a pipeline (rigid pipe) and a structure. It is next to impossible (at least very difficult) to connect a rigid pipe line directly to a structure preinstalled on the seabed. Thus, often an intermediate piece of pipe, frequently termed a "spool" exists between the pipe line and the structure. In order to be able to connect the spool to the pipeline, the pipeline will be welded directly to a small structure including a connecting point. A spool is in principle like the jumper described above.

Direct connection of a flexible pipeline to a structure. In some cases it is chosen to use so called flexible pipes instead of rigid steel pipes. Such pipes can be compared with a big garden hose. Then it is not necessary with a spool or jumper between the end of the pipe and the structure. The pipe is so flexible that one may have a mobile connector part right on the end of the pipe, and connect this one directly to the stationary connector part on the structure. Then it is neither necessary to make precise measurements of the position on the connecting point on the structure.

BRIEF DESCRIPTION OF THE INVENTION

The present connection system can be used in all three cases.

In order to facilitate subsea mating of pipe ends, a completely new connector design has been developed. As before, this consists of a stationary part resting on a bottom structure and a mobile part to be lowered from the surface and a clamp connector which performs the final connecting operation. However, the new connector is to take regards which till now have not been attended to in a satisfactorily way.

Thus the now suggested vertical connector is designed from the following presumptions:

Ensure that damage on the seal between the pipe flanges is avoided

Ensure secure entering of the connector parts at angular deviations up to 6-8° between the connector parts Ensure secure entering of two sets of connector parts on a jumper pipe where the distance between the stationary connector parts and the mobile connector parts not completely agree with each other, i.e. that the jumper pipe is strained during the entering operation Enable entering even if a pipeline at one end deviate up to 15° in the horizontal plane Enable replacement of the sealing ring if damaged without the necessity to remove the entire mobile connector part Enable entering without external guiding means.

These problems are resolved by a connector of the introductory said kind which is distinguished in that the stationary connector part has an upwards projecting bare pipe sub, that the mobile connector part has integrated, internally shielding and guiding means to assist by angular deviation entering of the mobile connector part onto the stationary connector part, that the internally guiding means define an internal upper and lower cavity which includes a lower introduction opening which is larger than the diameter of the stationary pipe sub, the upper cavity is tapering upwards and is smaller than the lower cavity, said guiding means that define the first and second cavity cooperate with the upwards projecting pipe sub during a landing of the mobile connector part over the pipe sub to create an aligning force, and that the mobile connector part carries a sealing ring in a shielded way relative to said guiding means, said sealing ring being designed for mating against the bare pipe boss to be tightened by the clamp connector till sealing connection.

Thus it is to be understood that the connector parts have been designed in this way in order to obtain secure entering between the connector parts by angular deviation up to 6-8° between the connector parts, at the same time as the structural shape is specially designed with a view to create an aligning moment to bring the pipe ends into line with each other during the entering operation.

In one embodiment the internal guiding means include a lower set of plate elements which have their plate planes pointing substantially in a radial direction and are arranged in a circumferentially way around a central axis thereof, and the internally directed plate edges of the plate elements have a predetermined contour and define together said cavity.

Conveniently, the internal guiding means include an integrated annular body which define the opening itself, and at the same time ties the plate elements together.

The largest gap between respective radially pointing plate elements is smaller than the diameter of the stationary pipe boss.

Further, the internal guiding means may preferably include an upper set of plate elements with their plate planes directed in a substantially radial direction and are arranged circumferentially around the central axis and all the inwards directed plate edges of the plate elements define together said upper cavity which tapers upward and is smaller than the first cavity.

The largest distance between respective radially pointing plate elements in the upper set is less than the diameter of the pipe boss.

Further, the stationary connector part may include a number of guide plates which are arranged circumferentially around the pipe boss and extend in an axial longitudinal direction and are pointing outwards in a radial direction.

The stationary connector part may include a base board which functions both as a finishing guide means during the mating operation and for attachment of a pull/push tool.

The guide plates may have a predetermined, special designed contour on that surface pointing radially outwards, said surfaces constitute guiding means for the mobile connector part.

In a preferred embodiment the connector is of the clamp connector type having internally arranged annular inclined surfaces which by activation forces two pipe flanges axially towards each other, where one of the pipe flanges, normally the upper one, has the sealing ring with externally arranged annular inclined surfaces installed. Alternatively the connector can be of the "collet connector" type.

As an auxiliary equipment the mobile connector part may include an adapted attachment for installation of a pull/push tool. The tool is able to pull the connector parts together by substantial force, or push them from each other. The tool may be installed in a horseshoe opening in an annular body on the mobile part.

Conveniently the sealing ring is a pure metallic seal. It may further include one or more redundant elastomeric sealings or gaskets on the metallic sealing surfaces.

In a preferred embodiment of the vertical connector the second set of plate elements is arranged with such distance from each other that access for a tool is created for possible replacement of the seal.

Due to the structure of the new connector, a minimum of damage is obtained on the sealing surfaces because:
  the conical sealing surface on the stationary pipe boss is internal and faces upwards (creates less likelihood for parts on the structure to hit just this part since it is internally located)
  the sealing element now is installed (normally) on the mobile part which is to be lowered (thus the sealing element is shielded during the lowering contrary to if it was located on top of the stationary boss).

By the above described new connector structure two mobile connector parts with a jumper line between them will be possible to install to two stationary connector parts even if a substantial angular deviation is present between the stationary and the mobile connector parts.

BRIEF DESCRIPTION OF THE DRAWINGS

Other and further objects, features and advantages will appear from the following description of preferred embodiments of the invention, which is given for the purpose of description, and given in context with the appended drawings where.

DETAILED DESCRIPTION OF THE PREFERRED EMBODIMENT

Figure 1A:
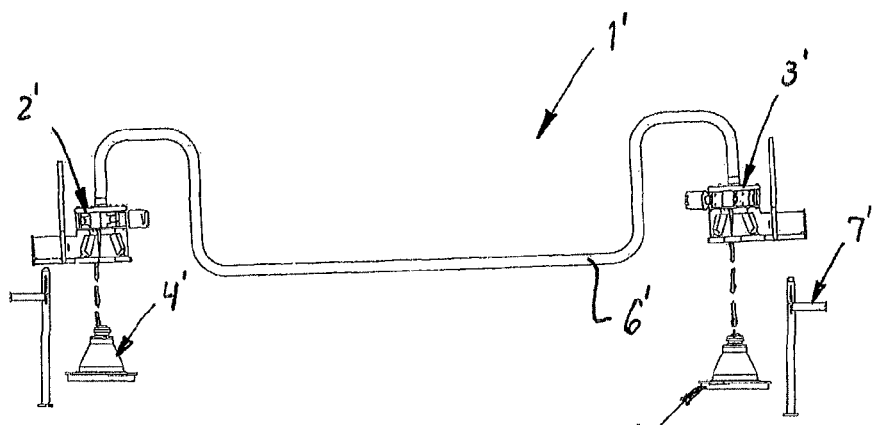
FIG. 1A shows an elevation view of a jumper line according to the prior art.
Figure 1B:
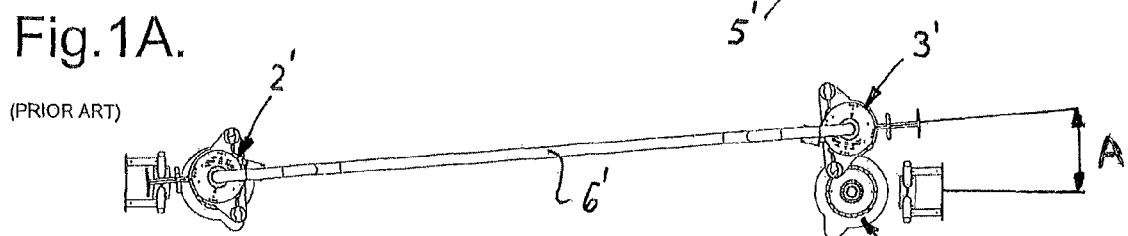
FIG. 1B shows a top view of the jumper line according to FIG. 1A.

Reference is first made to FIGS. 1A and 1B which illustrate the traditional way (marked as prior art) to construct a jumper pipeline 1' having the mobile connector part 2', 3' at each end. The mating of the mobile connector parts 2', 3' with the stationary connector parts 4' 5' will take place in a substantially vertical direction, thus the term "vertical connector". The jumper pipeline 1' further includes a rigid pipe 6' which extends between the two connector parts 2', 3'. The mobile connector part 2', 3' at each end of the rigid pipe 6' faces downwards in order to be lowered over and engaged with the upwards facing stationary connector parts 4', 5'.

As indicated, such pipes 6' rarely extend in a straight line between the connecting points. Instead they are intentionally designed with one or more bays, as shown in FIG. 1A. This is to be able to adapt to the connecting points without rigid requirements to the production tolerances. It may be a long pipe span of several tenths of meters between the connecting points. As indicated on FIG. 1A, the previous solution will be able to take care of a difference in height between the connector parts 2', 3' during the landing operation. Both the present and previous solution should be installed slightly inclined such that one end of the jumper/spool is landed before the other end. The difference in height should be such that one end is completely landed before the other side engages. Thus the entire jumper can be rotated into position before the second end is landed. FIG. 1B indicates that a directional deviation of about 5° (A) between the stationary connector parts 4', 5' and the mobile connector parts 2', 3' during the landing operation can be handled.

Figure 2A:
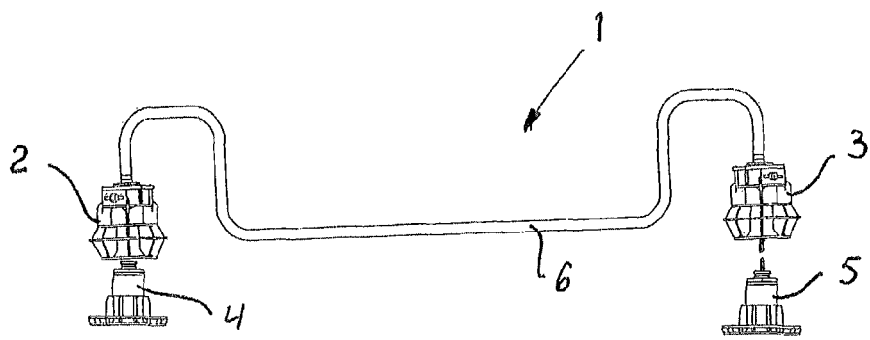
FIG. 2A shows an elevation view of a jumper line with use of the new solution.
Figure 2B:
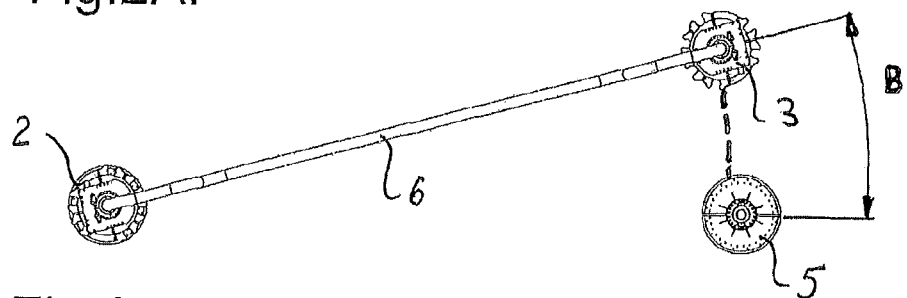
FIG. 2B shows a top view of the jumper line according to FIG. 2A.

Reference is now made to FIGS. 2A and 2B which illustrate the new and improved way of how to construct a jumper line 1 with a new type of mobile connector part 2, 3 at each end. The mating of the new mobile connector parts 2, 3 with the new stationary connector parts 4, 5 will, as before, take place in a substantially vertical direction. The jumper line 1 includes, as before, a rigid pipe 6 extending between the two connector parts 2, 3. As before, the mobile connector parts 2, 3 at each end of the rigid pipe 6 face downward to be installed over and connected to the upwards facing stationary connector parts 4, 5, The problem to be addressed is as described above with regard to FIGS. 1A and 1B, in addition to a desire that the tolerances during production are increased. As indicated on FIG. 2A, the new solution can handle a substantial difference in height between the connector parts 2, 3 during the landing operation. FIG. 2B indicates, however, that a directional deviation of about 15° (B) between the stationary connector parts 4, 5 and the mobile connector parts 2, 3 during the landing operation can be handled with the new connector parts 2, 3, 4, 5. This will be outlined in further detail in the following.

Figure 3:
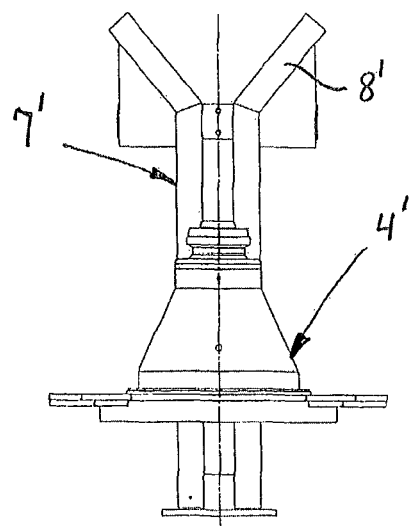
FIG. 3 shows a stationary connector part (lower) according to the prior art.
Figure 4:
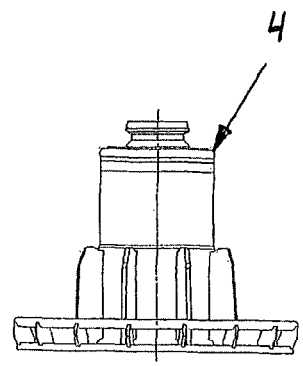
FIG. 4 shows a stationary connector part (lower) according to the new solution.

FIG. 3 shows a stationary connector part 4' according to the prior art and FIG. 4 a new stationary connector part 4. FIG. 3 shows an associated guiding system 7' which is to assist with the guiding of a mobile connector part 2' down over the stationary connector parts 4'. To this object independent guiding means 8' are arranged. As one will see, the new stationary connector parts 4 are completely free from such an associated guiding system. Instead all design features, or means, which assist with the guiding during a landing operation and the interconnection, are now integrated and part of the stationary connector part 4.

Figure 5:
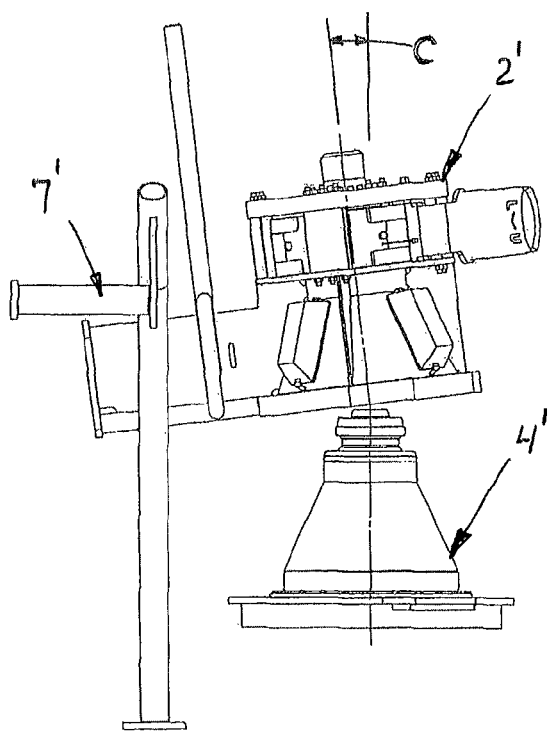
FIG. 5 shows a mobile connector part (upper) when it is about to enter the stationary connector part according to the prior art.

FIG. 5 shows once again the stationary connector part 4' according to the prior art, now with a mobile connector part 2' which is about to land over the stationary connector part 4'. According to this prior solution the maximum angular deviation is about 6.5° (C.) between the central axis of the stationary connector part 4' and the mobile connector part 2' in all directions during the mating operation.

Figure 6:
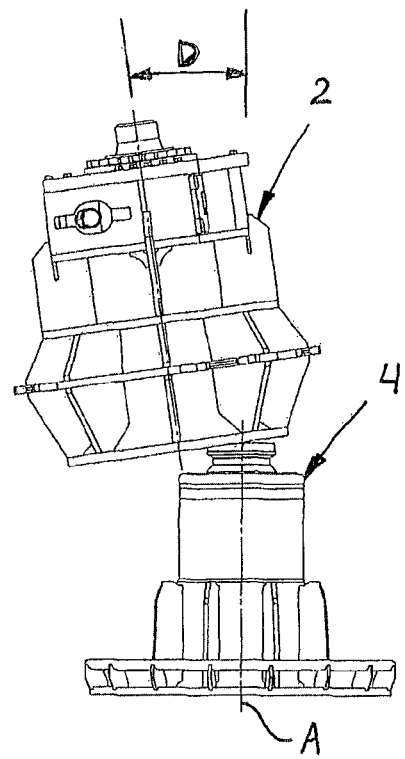
FIG. 6 shows a mobile connector part (upper) when it is about to enter the stationary connector part according to the new solution.

FIG. 6 shows again the new stationary connector part 4, now with a mobile connector part 2 which is about to land over the stationary connector part 4, According to this new solution the maximum angular deviation is about 8° (D) between the central axis of the stationary connector part 4 and the mobile connector part 2 in all directions during the mating operation.

Figures 7, 8:
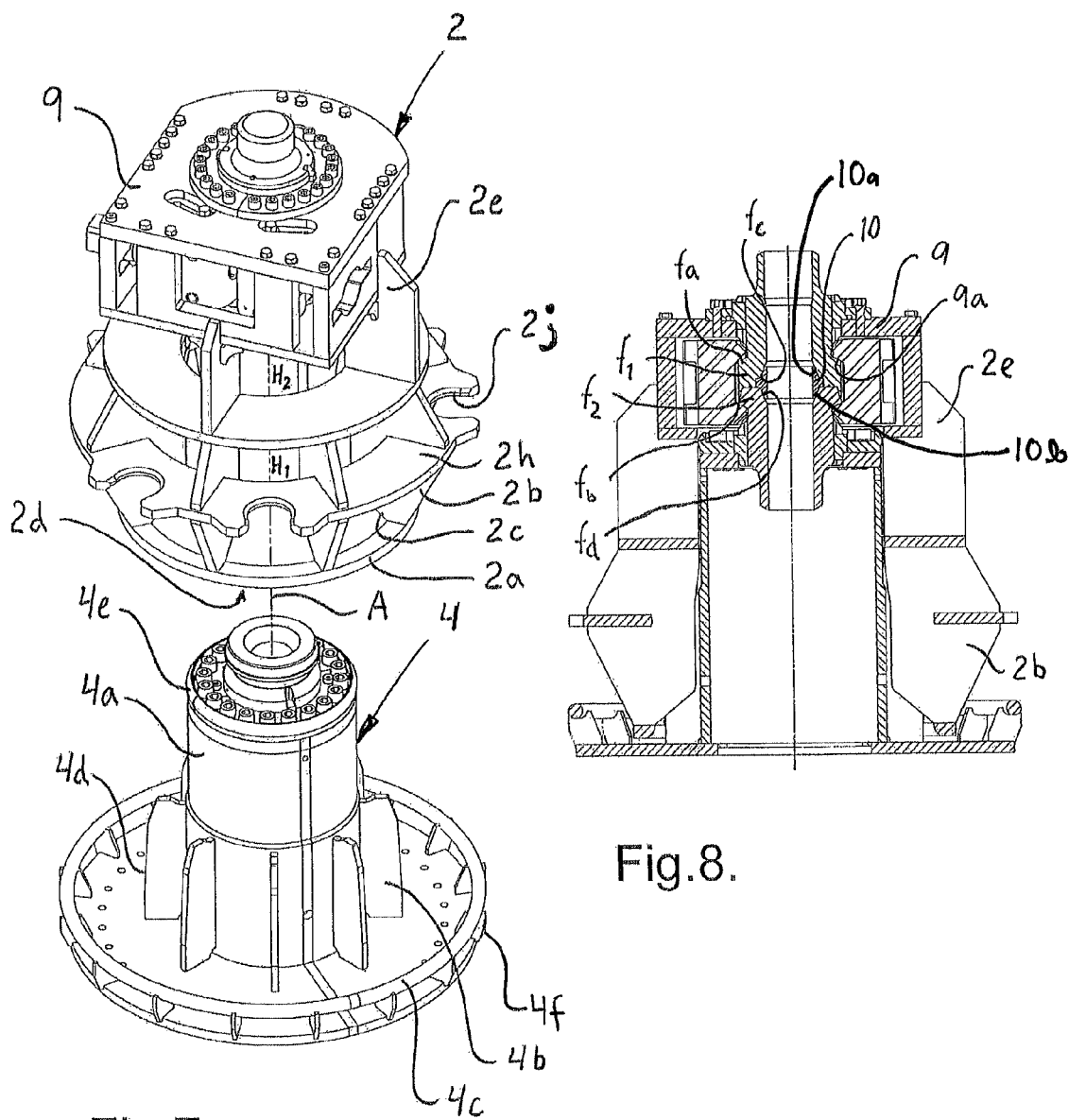
FIG. 7 shows in perspective view the two connector parts ready for mating.
FIG. 8 shows an axial view through a completed assembled connector.

With reference to FIG. 7, the vertical connector 2, 4 will now be described in closer detail. The vertical connector is composed by three main parts; the stationary connector part 4 which is normally landed on a submerged structure (not shown), such as a Christmas tree or a manifold structure, the mobile connector part 2 designed for immersing and connecting to the stationary connector part 4, and a clamp connector 9. After the mating of the connector parts 2, 4 the clamp connector 9 locks the connector parts 2, 4 to form a lasting sealing connection.

The stationary connector part 4 has an upwards projecting bare pipe boss 4a. A number of guide plates 4b are arranged circumferentially around the pipe boss 4a and extend in an axial longitudinal direction and are pointing radially outwards. The stationary connector part 4 includes a foot board 4c which acts as an attachment to secure a pull/push tool. It is to be noted that the guide plates 4b has a specially designed contour on that surface 4d facing radially outwards. This surface 4d is used for guidance of the mobile connector part 2, which will be described later.

The mobile connector part 2 has in turn integrated internal shielding and guiding means 2a, 2b, 2c which are to assist during the mating and entering operation by angular deviation between the mobile connector part 2 and the stationary connector part 4. The internal guiding means 2a, 2b, 2c define an internal space or cavity $H_1$ which opens out in a lower introduction opening which naturally is somewhat larger than the diameter of the stationary pipe boss 4a. In addition the mobile connector part 2 has an upper space or cavity $H_2$ which tapers upwards. The upper cavity $H_2$ is smaller than the lower cavity $H_1$ and correspondingly the upper cavity $H_2$ also has an introduction opening which is somewhat smaller than the lower opening. This upper cavity $H_2$ is put into effect when the connector parts 2, 4 approaches the finishing phase and acts in an aligning way on the connector parts 2, 4, i.e. the connector axes align to coincide with each other.

This is explained in that the guiding means, which define the first and second internal cavity, by the guide plates 4b thereof cooperate with the upwards projecting pipe boss 4a during landing of the mobile connector part 2 over the pipe boss 4a to create an aligning force. As shown, the internal guiding means can include the lower set of plate elements 2b which have their plate planes directed substantially in radial direction and which are circumferentially arranged around the central axis A of the connector part 2.

It is to be understood that the inwardly directed plate edges 2c of the plate elements 2b together define said lover cavity $H_1$. The cavity $H_1$ terminates at the bottom by an integrated annular body, or ring, 2a, which defines the introduction opening 2d itself. Note that free passages are present between the guide plates 4b into the cavity $H_1$ which is defined by the described plate edges 2c. In the shown embodiment the number of plate elements 2b is eight, which are placed by a substantially equal distance apart.

Further, the largest distance between the respective radially pointing plate elements 2b are smaller than the diameter of the stationary pipe boss 4a. The internal guiding means also include an upper set of plate elements 2e which also have their plate planes pointing substantially in a radial direction and are circumferentially arranged around the central axis A of the connector part 2. The inwards directed plate edges 2f of the plate elements 2e define together said upper cavity $H_2$ which has an introduction opening 2g. The cavity $H_2$ is tapering upwards and is smaller than the first cavity $H_1$. The introduction opening 2g is in turn smaller than the opening 2d. The largest distance between the respective radially directed plate elements 2e in the upper set are smaller than the diameter of the pipe boss 4a. In the shown embodiment the number of plate elements 2e is four. These are placed with a substantial equal distance apart. Note again that it is free passages between the guide plates 2e into the cavity $H_2$ defined by the described plate edges 2f. Here, such a fair space is provided that it is possible to have access by a tool if desired. It is to be understood that the upper plate elements 2e in a practical embodiment plainly can be continuations of the lower plate elements 2b, i.e. four of them.

It is further to be understood that the mobile connector part 2 supports a sealing ring 10 in a shielded way in respect of the guiding means, the sealing ring 10 is intended for engagement with the bare pipe boss 4a to be tightened with the clamp connector 9 to sealed connection. The sealing ring 10 will typically be a pure metallic seal, but any suitable seal can be used.

The illustrated clamp connector 9 is of the type having internally arranged, annular and inclined surfaces which by activation forces two pipe flanges axially towards each other. One of the pipe flanges has said sealing ring 10 mounted thereon, which also has external, annular and inclined surfaces. As an alternative to the clamp connector 9, a "collet connector" (not shown) can be used.

In order to make the finished mating, the mobile connector part 2 can include at least one adapted horseshoe shaped attachment 2j, on a horizontally extending annular plate body 2h for insertion of a pull/push tool (not shown) which can be activated to pull the connector parts 2, 4 towards each other, or push them away from each other.

As mentioned, the plates of the second set of plate elements 2e are arranged with such a distance apart that access for a tool for possible later replacement of the seal 10, described above, is created.

With reference to FIG. 8, a connector where the connector parts 2, 4 are completely mated and tightened by means of a clamp connector 9 is shown. The clamp connector 9 has internal, annular inclined surfaces 9a which by circumferential activation influence on and forces complementary annular inclined surfaces $f_a$, $f_b$ on the two pipe flanges $f_1$ and $f_2$ on the connector parts 2, 4 axially towards each other. The pipe flanges $f_1$ and $f_2$ also have internal inclined surfaces $f_c$, $f_d$. One of the pipe flanges $f_1$ has said sealing ring 10 mounted thereon. The sealing ring 10 also has external, annular inclined surfaces 10a, 10b which are tightened by the internal inclined surfaces $f_c$, $f_d$ during said activation.

A mating and connecting operation will now be described together with the FIGS. 9-14. Details of the connector parts 2, 4 will not be described again, only the material entering and aligning functions.

Figure 9:
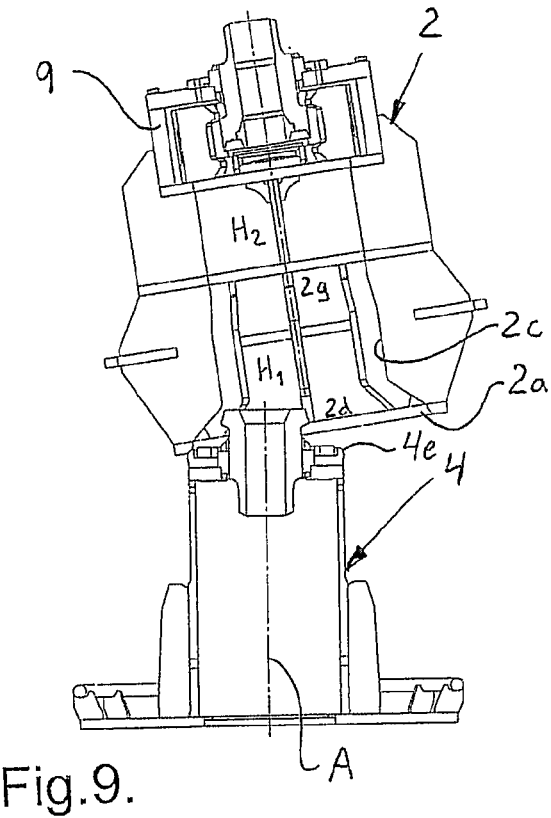
FIGS. 9-14 show sequences during the mating operation, the axial alignment and connection of the two connector parts according to the invention.

FIG. 9 shows a first phase of the mating of the mobile connector part 2 with the stationary connector part 4. The mobile connector part 2 arrives inclined relative to the stationary connector part 4 and is still allowed to enter and connect in a safe way. As one will observe from the figure, the ring 2a, which defines the introduction opening 2d, first hits a bevelled surface 4e on the pipe boss 4a when the mobile connector part 2 is inclined in respect of the stationary connector part 4.

Figure 10:
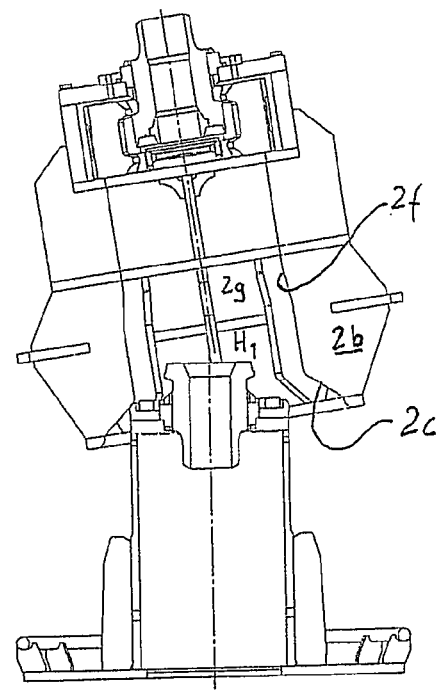

FIG. 10 shows further lowering of the mobile connector part 2 over the pipe boss 4a on the stationary connector part 4. The pipe boss 4a thus enters the first cavity $H_1$ within the mobile connector part 2. The specially designed plate edges 2c of the guide plates 2b hit the bevelled surface 4e on the pipe boss 4a. Since the plate edges 2c in this first phase slant inwards and upwards, an aligning effect immediately starts when the mobile connector part 2 is guided towards the stationary connector part 4. This results in a coarse alignment.

Figure 11:
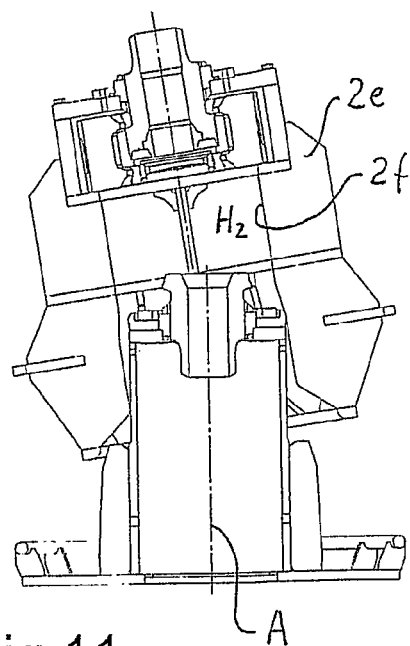

FIG. 11 shows a further mating step of the mobile connector part 2 with the stationary connector part 4. The pipe boss has now completely entered the first cavity $H_1$ but still stands inclined therein. Now the beveled face 4e of the pipe boss 4a hits the entrance of the upper cavity $H_2$ defined as the second opening 2g, The upper cavity $H_2$ is defined by the plate edges 2f as previously described. The upper cavity $H_2$ is tapering upwards in a lower portion thereof, as one can see from the figures, before it passes into even diameter. About simultaneously the inside of the ring 2a hits at least one of the guide plates 4b near the top thereof. This, together with the contact between the beveled edge 4e and the plate edges 2c, creates an aligning moment between the connector parts 2, 4.

Figure 12:
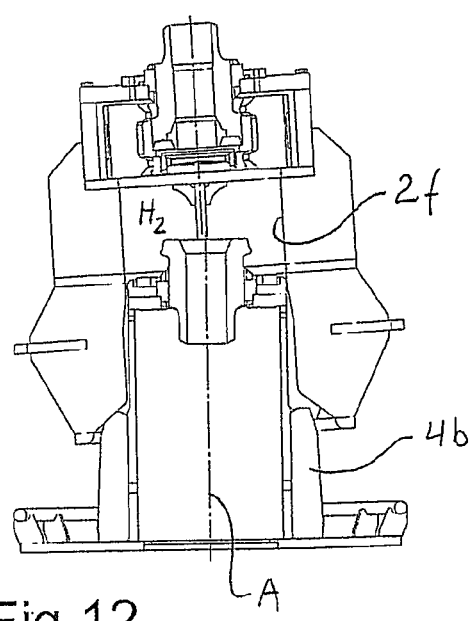

FIG. 12 shows the next mating step of the mobile connector part 2 with the stationary connector part 4. The bevelled surface 4e of the pipe boss 4a slides along the plate edges 2f. Their lower portions define the tapered part of the upper cavity $H_2$. During this lowering operation the mobile connector part 2 is further aligned relative to the stationary connector part 4. It is also to be noted that in this phase the mobile connector part 2 will be able to make restricted rotation relative to the stationary connector part 4, due to such circumstance that the guide plates 4b and 2b hit each other. The aligning operation is continued by the engagement between the ring 2a and the guide plates 4b.

Figure 13:
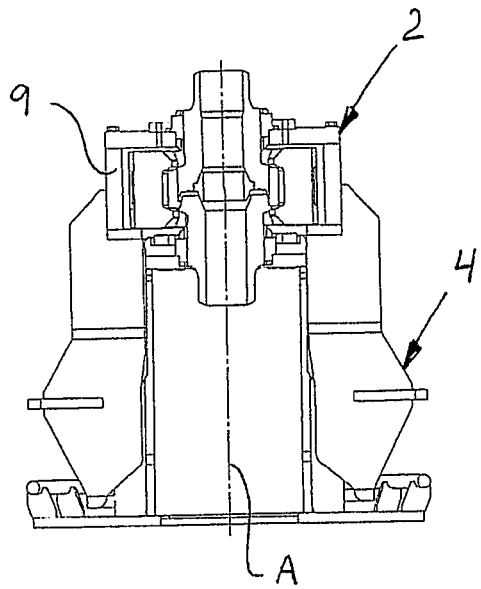

FIG. 13 shows the next mating step of the mobile connector part 2 with the stationary connector part 4, i.e. when the connector parts are nearly mated. The bevelled surface 4e of the pipe boss 4a has slid along the plate edges 2f all the way up to the top of the upper cavity $H_2$. During this finishing lowering of the mobile connector part 2 is finely aligned relative to the stationary connector part 4, and the connector parts are close to being completely aligned.

Figure 14:
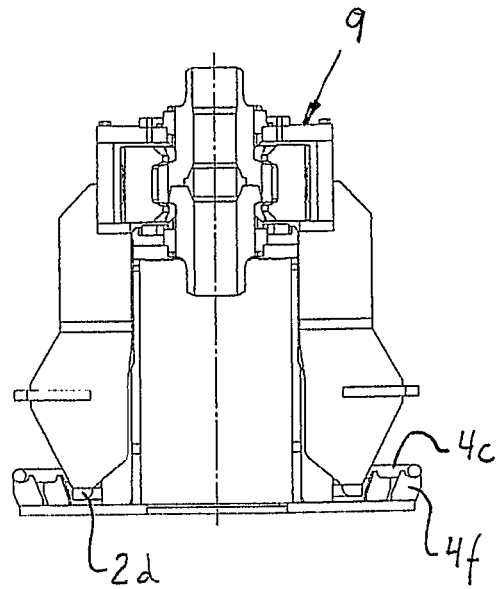

FIG. 14 shows the final and terminating phase of the mating of the mobile connector part 2 with the stationary connector part 4. Now it is the internal surfaces on a number of plate elements 4f, which attach the foot board 4c, that interact with the external surface of the annular part 2d on the mobile connector part 2. During this operation the final fine alignment of the mobile connector part 2 relative to the stationary connector part 4 takes place. This will normally be performed by means of the pull/push tool. FIG. 14 also shows that the clamp connector 9 is tightened and the connection is thus made up.

Figure 15:
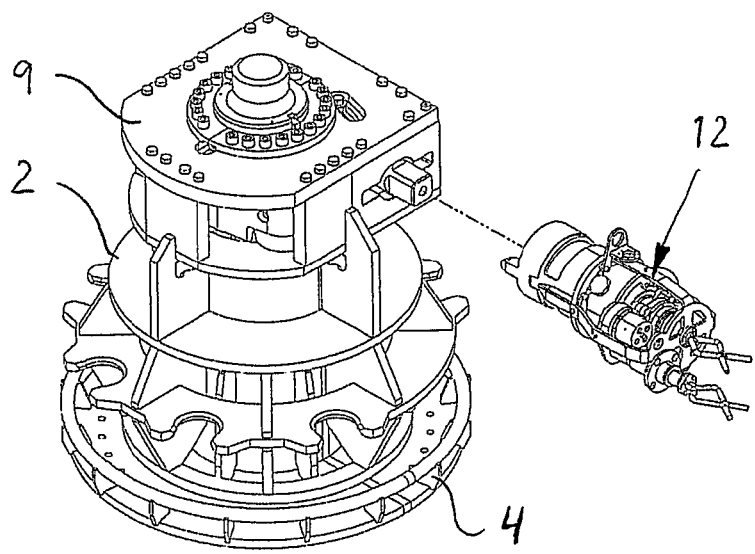
FIG. 15 shows in perspective view the finished connected connector with associated tool for making up a clamp connector.

FIG. 15 shows in principle the same as FIG. 7, only with the difference that the connector parts 2, 4 are completely mated and the connection is made up. In addition, the tool 12 that operates the clamp connector 9 is shown. How this is performed, is common known technique and will not be further described here.

What is claimed:

1. A vertical connector comprising:
   a stationary connector part,
   a mobile connector part connectable to the stationary connector part and
   a clamp connector,
   wherein said stationary connector part has an upward projecting pipe boss having a diameter,
   said mobile connector part has a guiding means to assist by angular deviation entering of the mobile connector part onto the stationary connector part,
   said guiding means defines an internal upper and lower cavity which includes a lower introduction opening which is larger than the diameter of the stationary pipe boss,
   said upper cavity is tapered and is smaller than the lower cavity,
   said guiding means cooperates with the upward projecting pipe boss during a landing operation of the mobile connector part over the pipe boss to create an aligning force,
   said guiding means comprising an upper set of plate elements each having a plate plane and an inward directed plate edge, the plate planes directed in a substantially radially outward direction from a central axis and circumferentially arranged around the central axis;
   said mobile connector part carries a sealing ring, wherein said sealing ring is protected by said guiding means, and said sealing ring is engageable with a conical sealing surface on an interior surface of the pipe boss and said sealing ring is capable of providing a seal with said interior surface of the pipe boss in a subsea environment, and said clamp connector secures the stationary connector and the mobile connector together into a sealing connection.

2. The vertical connector as defined in claim 1, said guiding means further comprising:
- a lower set of plate elements each having a plate plane and an inward directed plate edge, wherein the plate planes point in a substantially radially outward direction from the central axis and are circumferentially arranged around the central axis thereof, and
- the inward directed plate edges of the lower set of plate elements have a predetermined contour and define together said lower cavity.

3. The vertical connector as defined in claim 2, said guiding means further comprising an integrated annular body defining the lower introduction opening, and tying the plate elements together.

4. The vertical connector as defined in claim 2, further comprising a plurality of gaps between adjacent radially pointing plate elements in the lower set which are smaller than the diameter of the stationary pipe boss.

5. The vertical connector as defined in claim 1, wherein the inward directed plate edges of the upper set of plate elements define a tapered transition between the upper cavity and the lower cavity.

6. The vertical connector as defined in claim 1, further comprising a plurality of gaps between adjacent radially pointing plate elements in the upper set which are smaller than the diameter of the pipe boss.

7. The vertical connector as defined in claim 6, said stationary connector part comprising a number of guide plates arranged circumferentially around the pipe boss and extending in an axial longitudinal direction and pointing outward in a radial direction.

8. The vertical connector as defined in claim 7, said stationary connector part further comprising a base board functioning as an attachment to secure a tool.

9. The vertical connector as defined in claim 8, said guide plates of the stationary connector part comprising a contour on a surface pointing radially outward for guiding the mobile connector part, an annular body of the mobile connector part first hitting an upper portion of at least one of the surfaces and creating an aligning moment.

10. The vertical connector as defined in claim 9, said clamp connector comprising internally arranged annular inclined surfaces which by circumferential activation forces two pipe flanges axially towards each other, where one of the pipe flanges has the sealing ring, said sealing ring having externally arranged annular inclined surfaces installed.

11. The vertical connector as defined in claim 1, said mobile connector part comprising at least one adapted attachment for installation of a tool, said attachment being arranged on an annular body.

12. The vertical connector as defined in claim 11, further comprising a second set of plate elements arranged with such distance apart that access into the upper cavity by a tool is created for possible replacement of the sealing ring.

* * * * *